United States Patent
Muto et al.

(10) Patent No.: US 7,986,596 B2
(45) Date of Patent: Jul. 26, 2011

(54) OPTICAL RECORDING/REPRODUCING METHOD, SYSTEM, AND PROGRAM

(75) Inventors: Hideyuki Muto, Tokorozawa (JP); Junichi Furukawa, Tokorozawa (JP); Yoshio Sasaki, Tokorozawa (JP)

(73) Assignee: Pioneer Corporation, Tokyo (JP)

(*) Notice: Subject to any disclaimer, the term of this patent is extended or adjusted under 35 U.S.C. 154(b) by 419 days.

(21) Appl. No.: 12/305,845

(22) PCT Filed: Jun. 19, 2007

(86) PCT No.: PCT/JP2007/062272
§ 371 (c)(1),
(2), (4) Date: Dec. 19, 2008

(87) PCT Pub. No.: WO2007/148672
PCT Pub. Date: Dec. 27, 2007

(65) Prior Publication Data
US 2010/0008198 A1  Jan. 14, 2010

(30) Foreign Application Priority Data
Jun. 20, 2006  (JP) .................. 2006-170664

(51) Int. Cl.
*G11B 20/00* (2006.01)
*G11B 5/00* (2006.01)
*G11B 7/12* (2006.01)
*G11B 5/52* (2006.01)
*G11B 5/55* (2006.01)
*G11B 7/125* (2006.01)
*G11B 7/00* (2006.01)

(52) U.S. Cl. ............... 369/47.19; 369/47.5; 369/53.3; 369/53.26; 369/116

(58) Field of Classification Search ............... 369/47.19, 369/47.5, 47.51, 47.15, 116, 59.11, 59.12
See application file for complete search history.

(56) References Cited

U.S. PATENT DOCUMENTS
| | | | | |
|---|---|---|---|---|
| 6,731,584 B1* | 5/2004 | Nagara | | 369/116 |
| 2004/0190407 A1* | 9/2004 | Nobukuni et al. | | 369/47.1 |
| 2007/0053262 A1* | 3/2007 | Kikugawa et al. | | 369/47.28 |
| 2007/0159945 A1* | 7/2007 | Ohno et al. | | 369/59.11 |

FOREIGN PATENT DOCUMENTS
| | | |
|---|---|---|
| JP | 5-120717 | 5/1993 |
| JP | 5-197994 | 8/1993 |

(Continued)

OTHER PUBLICATIONS
International Search Report for PCT/JP2007/062272 mailed Sep. 4, 2007.

*Primary Examiner* — Joseph Haley
*Assistant Examiner* — Nicholas Lee
(74) *Attorney, Agent, or Firm* — Nixon & Vanderhye PC

(57) ABSTRACT

An optical recording/reproducing system 1 reads, based on a predetermined reproduction clock, information associated with a recording track of a recording medium by irradiating frequency light. The frequency light is scanned at a predetermined scan velocity. The optical recording/reproducing system includes a computer 13, a DSP 49, and a LD driver that modulate light by a drive signal on which a frequency signal is superimposed to thereby output the frequency light, and synchronizes a frequency of the frequency signal with a frequency of the reproduction clock according to the scan velocity.

7 Claims, 9 Drawing Sheets

FOREIGN PATENT DOCUMENTS

| | | |
|---|---|---|
| JP | 6-052569 | 2/1994 |
| JP | 7-073497 | 3/1995 |
| JP | 8-017065 | 1/1996 |
| JP | 2001-256652 | 9/2001 |
| JP | 2002-230814 | 8/2002 |
| JP | 2002-358681 | 12/2002 |
| JP | 2005-108342 | 4/2005 |

* cited by examiner

[FIG.1]
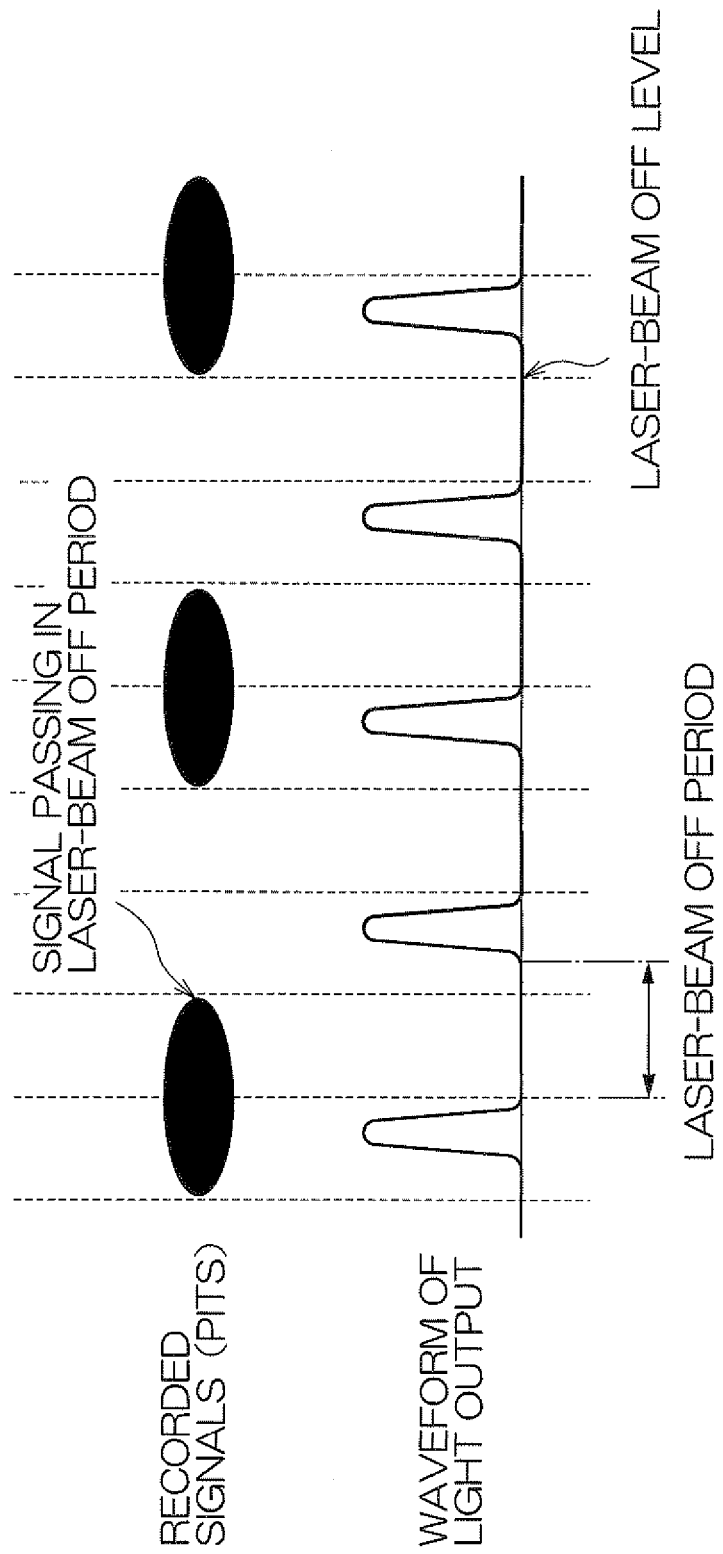

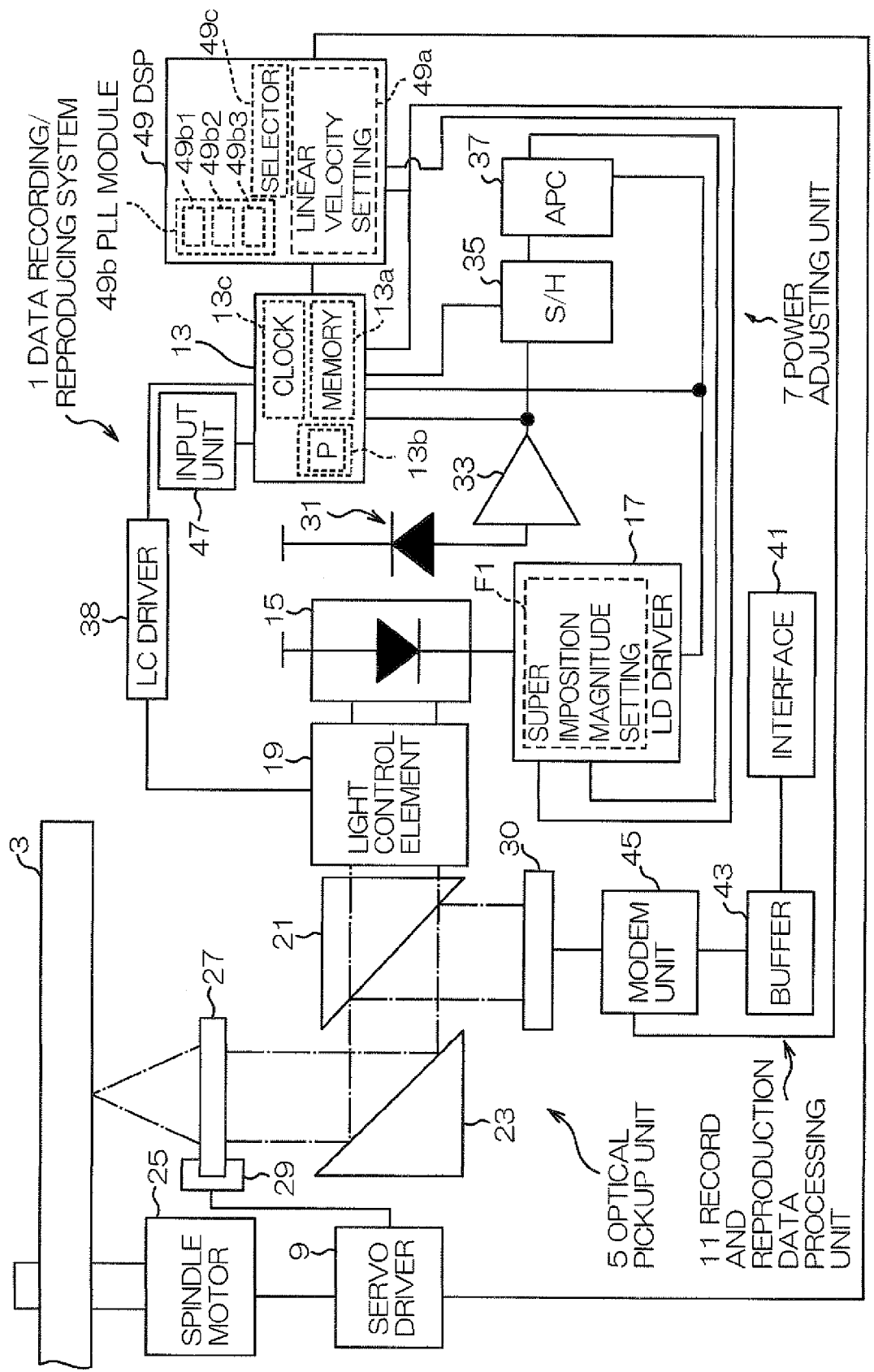
[FIG.2]

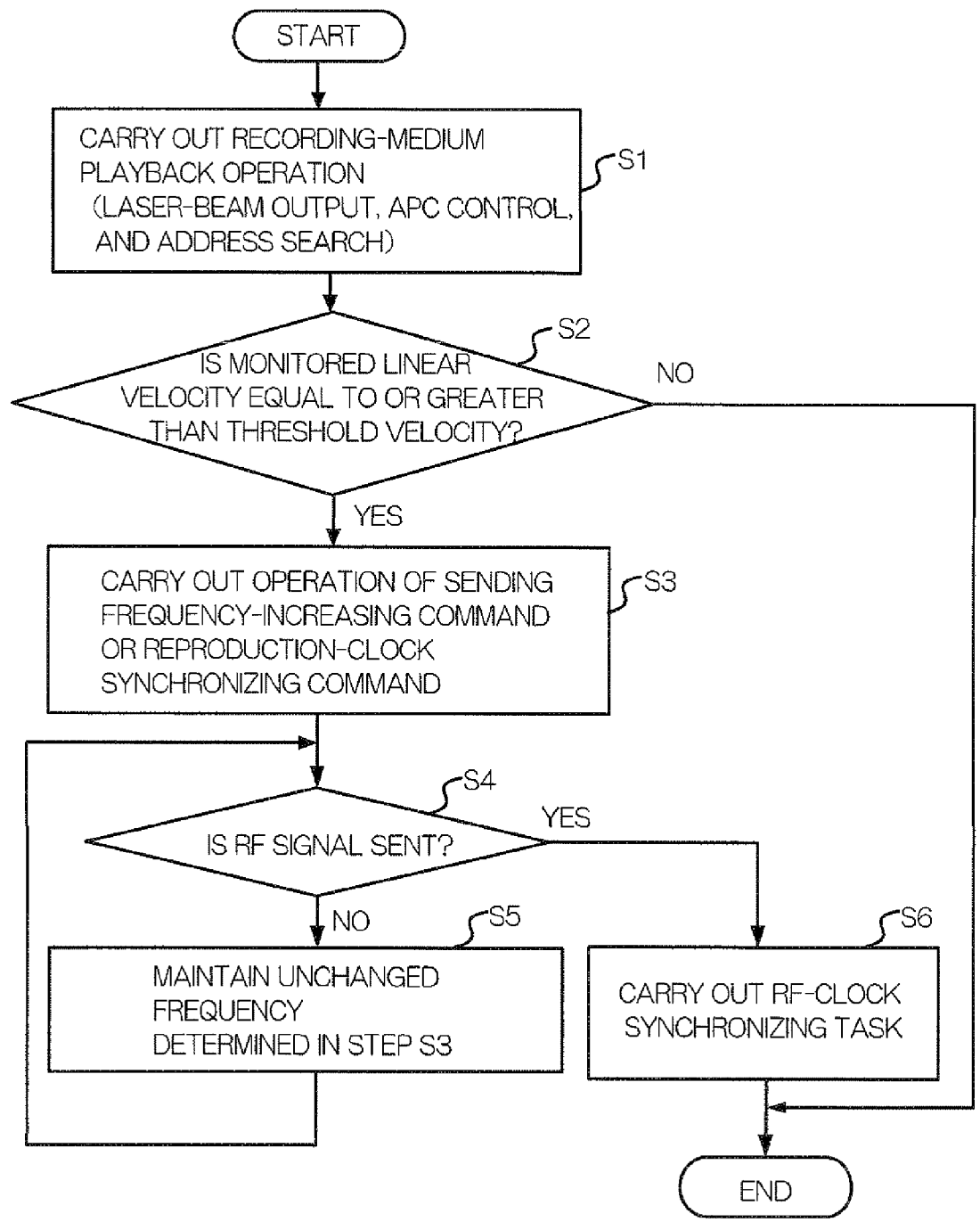

[FIG.4]
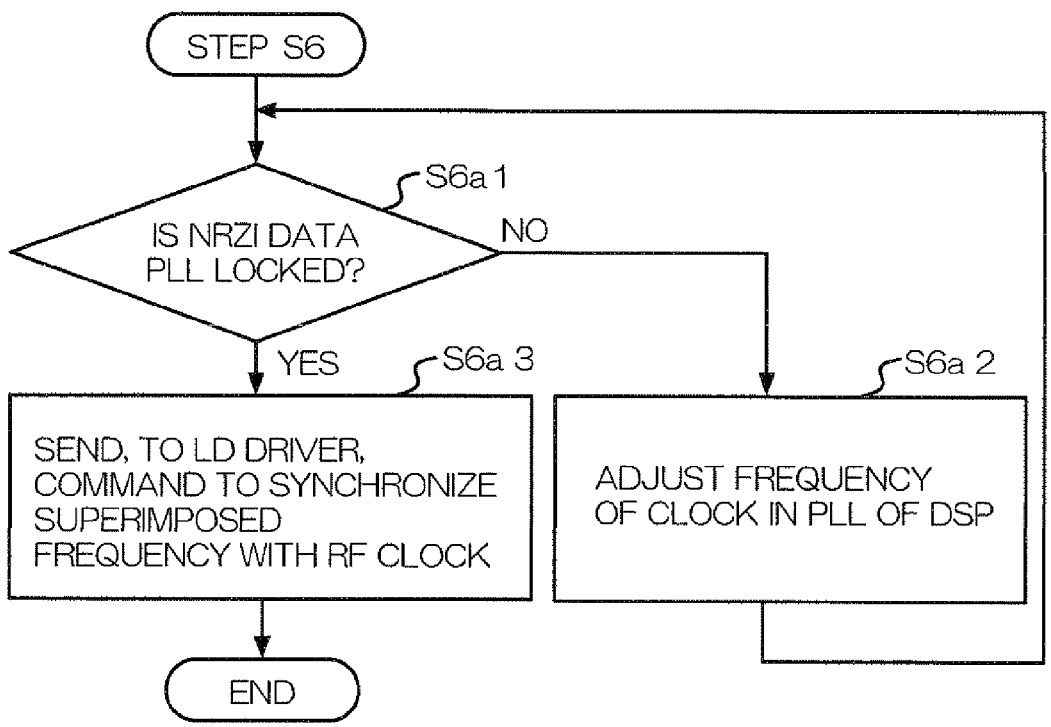

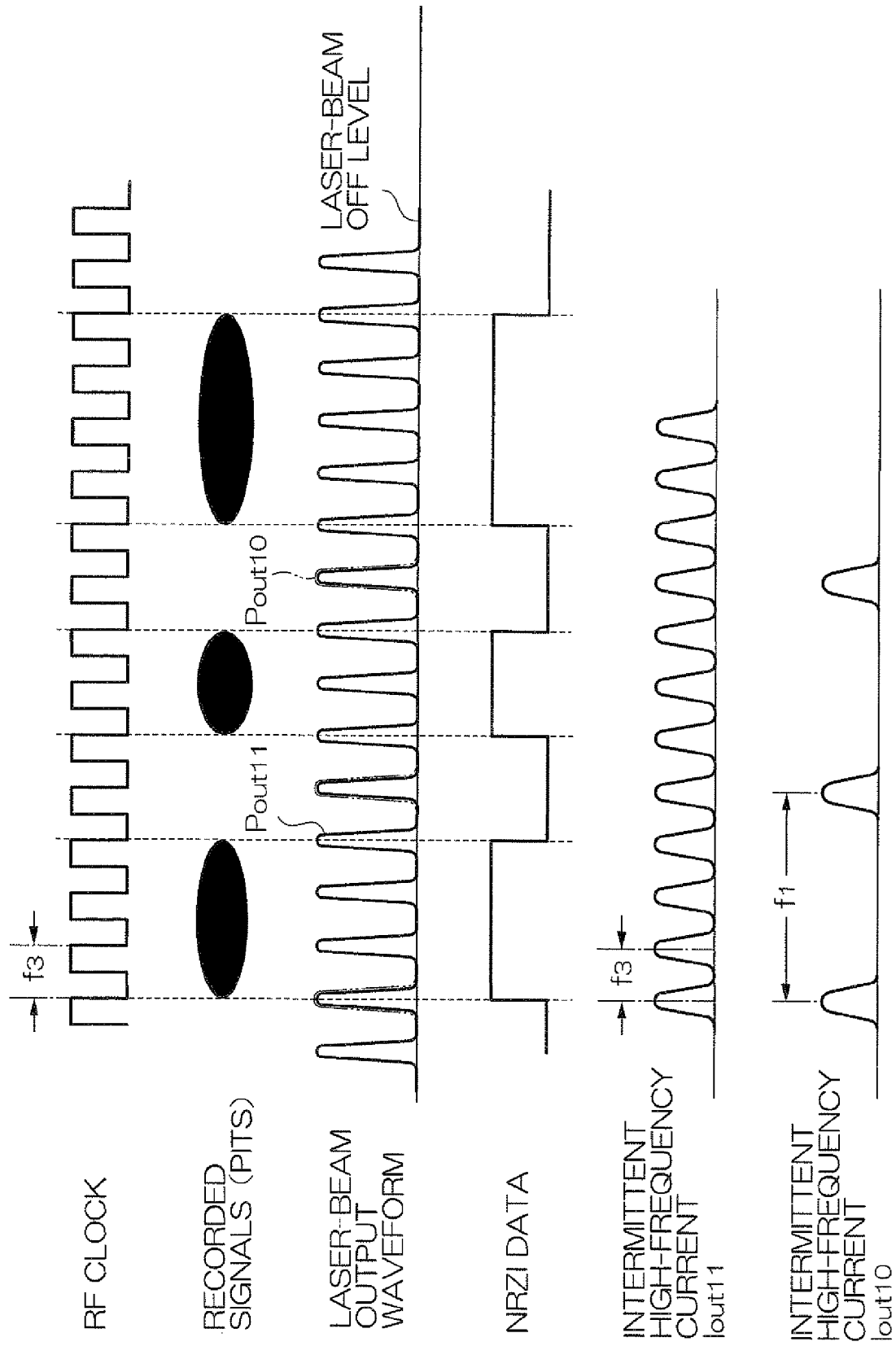
[FIG.5]

[FIG.6]
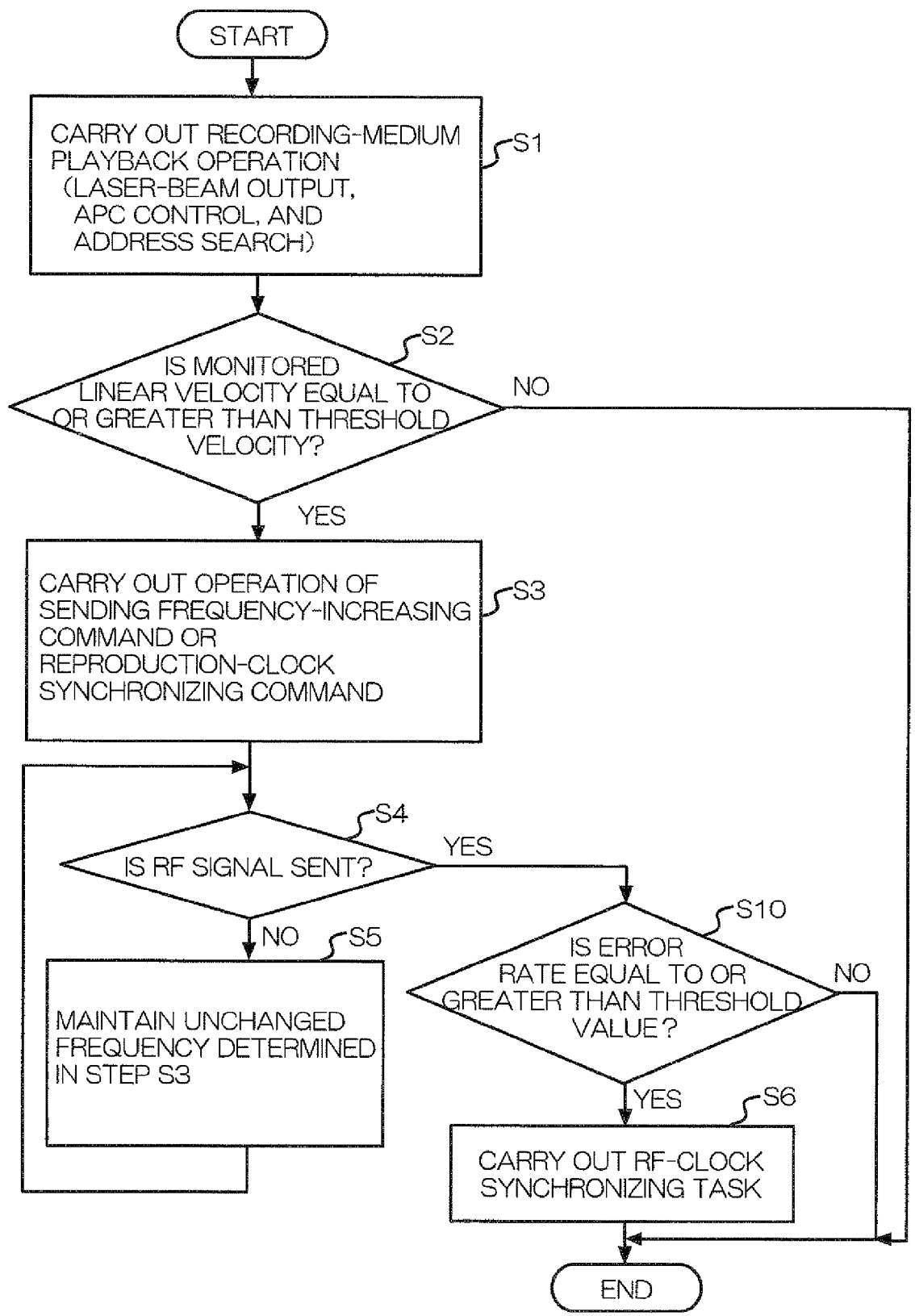

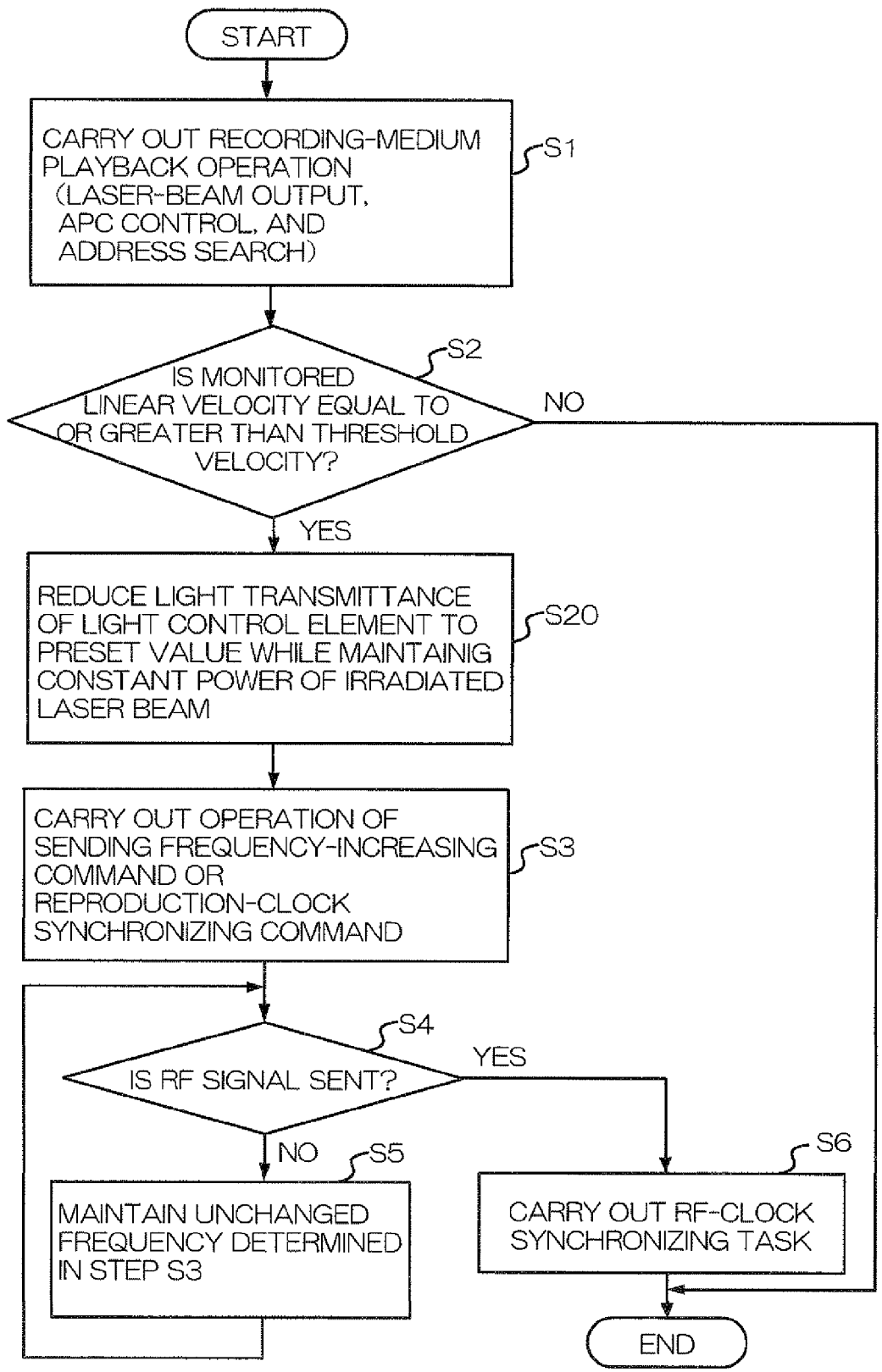

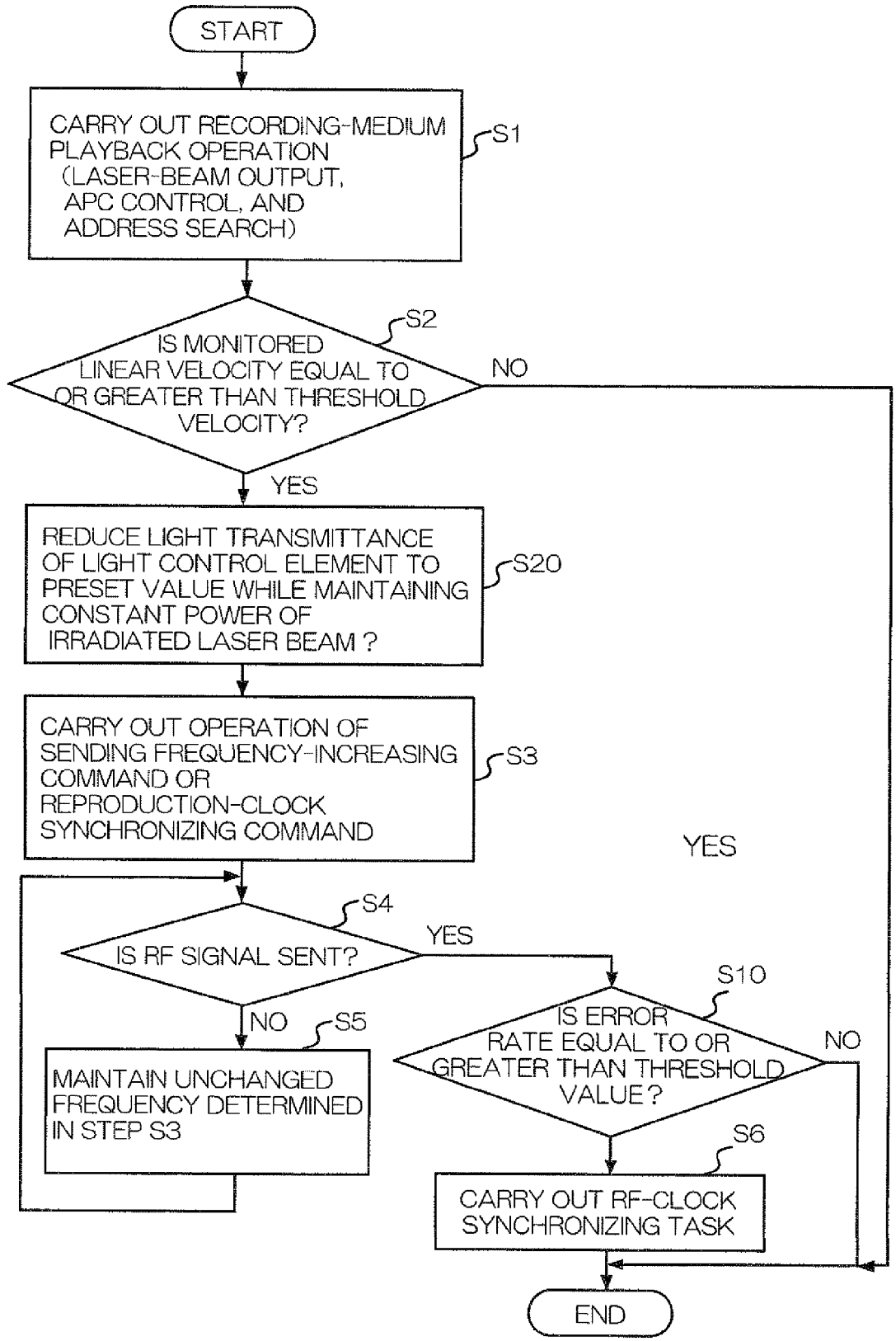
[FIG.8]

[FIG.9]
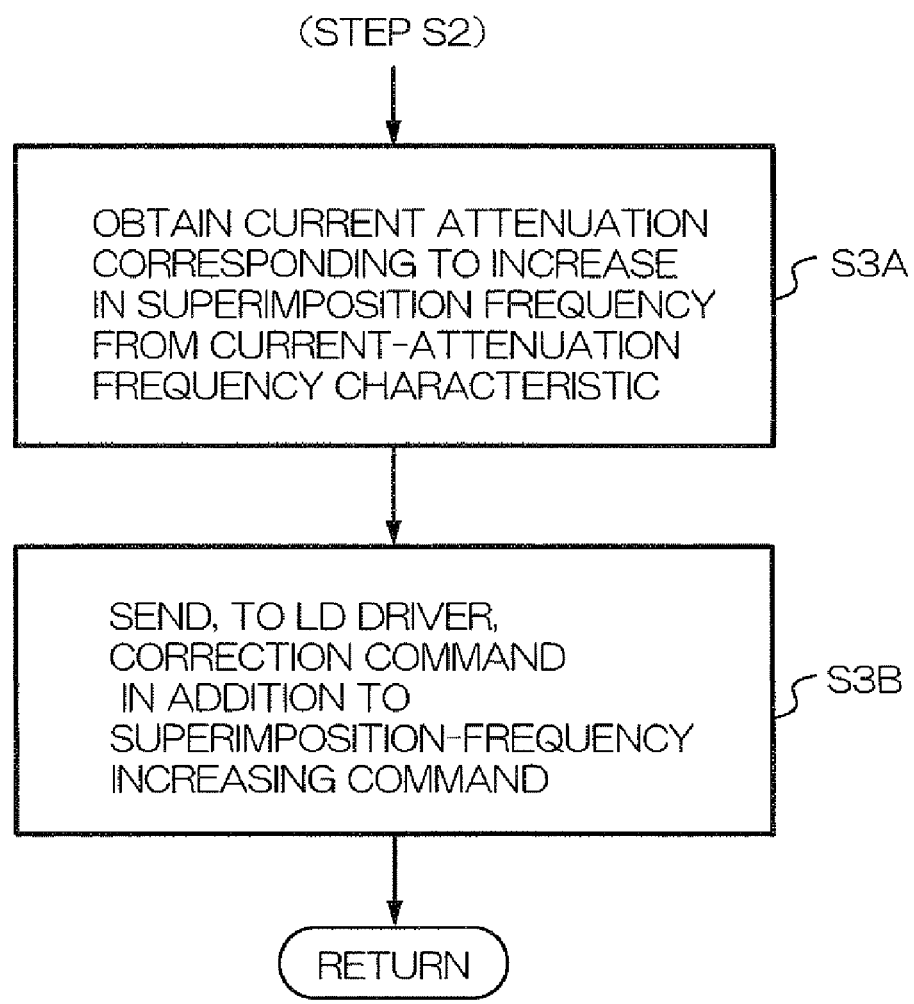

US 7,986,596 B2

OPTICAL RECORDING/REPRODUCING METHOD, SYSTEM, AND PROGRAM

This application is the U.S. national phase of International Application No. PCT/JP2007/062272 filed 19 Jun. 2007 which designated the U.S. and claims priority to Japanese Patent Application No. 2006-170664 filed 20 Jun. 2006, the entire contents of each of which are hereby incorporated by reference.

TECHNICAL FIELD OF THE INVENTION

The present invention relates to methods, systems, and programs for reproducing data optically recorded on a recording medium, such as a CD (Compact Disc), a DVD (Digital Versatile Disc), a Blu-ray Disc, a HD (High Definition) DVD, or the like.

BACKGROUND ART

Optical recording/reproducing systems are designed to irradiate a laser beam to a recording medium, such as a CD, a DVD, or a next generation DVD (Blu-ray DISC or HD DVD). This writes, into the recording medium, data to be written as a recorded signal by a state change in a recording layer of the recording medium due to the heat of the irradiated laser beam. The optical recording/reproducing systems are also designed to reproduce data corresponding to a beam reflected from a plurality of recorded marks (also referred to as 'recorded pits') constituting the recorded signal. Such optical recording/reproducing systems have rapidly become common as data recording/reproducing systems.

In such a data recording/reproducing system, an acceleration of a linear velocity of the laser beam from 1× to 2×, ..., 32× allows a rate or time of reproduction and/or recording to be reduced. The linear velocity represents a velocity of a laser beam travelling on a medium during recording and/or reproducing.

In such a data recording/reproducing system designed set forth above, a single-mode laser with a comparatively low operating current is used as a light source; this single-mode laser has a single longitudinal mode. A laser light outputted from a single-mode laser has very high coherency. For this reason, for reproducing data, it is required to maintain, at a high level, a ratio of a laser beam to noise, that is, CNR (Carrier to Noise Ratio); this noise may cause power fluctuations in a laser light outputted from the single-mode laser.

The noise that fluctuates the power of a laser beam includes external feedback noise and laser noise. The external feedback noise is due to interference with optical feedback from a recording medium and/or optical components. The laser noise is due to the fluctuations in temperature As described above, data writing (data recording) into a recording medium is carried out by a state change in a recording layer of the recording medium due to the heat of an irradiated laser beam. For this reason, there is a limit to the power of the irradiated laser beam during reproduction from the standpoint of the prevention of deterioration of the recording layer In this respect, Patent Documents 1 and 2 change an optical coupling efficiency, which is a ratio of the quantity of part of a laser beam focused on a recording medium to the total of the laser beam to be irradiated from an optical source, according to its mode (recording mode and/or reproducing mode), the kind of the recording medium and/or its recording layer (single layer and/or multiple layer). This can maintain the CNR at a higher level while reducing the power of the irradiated laser beam.

As another method for reducing the external feedback noise, as disclosed in Patent Document 3, a high-frequency current of the order of hundreds of megahertz is superimposed on a drive current (direct current) for a laser beam outputted from a single-mode laser so that the outputted laser beam flashes (on and of). This changes the longitudinal mode of the laser beam to a multimode. This method will be referred to as "high-frequency superimposing method" hereinafter.

Patent Document 1: Japanese Patent Laid-Open No. 2002-260272
Patent Document 2: Japanese Patent Laid-Open No. 2003-196880
Patent Document 3: Japanese Patent Laid-Open No. 2005-346823

DISCLOSURE OF THE INVENTION

Problems to be Solved by the Invention

FIG. 1 illustrates an example of a relationship between recorded signals written to a part of a recording track and the waveform of a laser beam output obtained by the high-frequency superimposing. Note that the run length (mark length) of a recorded signals along a recording track is commonly modulated. However, in FIG. 1, to facilitate the description, the recorded signals each with a minimum run length are written to a part of the recording track. The part of the recording track is linearly developed in the track direction.

In addition, in FIG. 1, an intermittent high-frequency current in the form of a sine wave with its positive duty (on-duty) being less than 50% is used as the high-frequency current.

When a reproducing linear velocity is increased so that the time required for the minimum run length of a recorded signal to pass through a scanning position of the laser beam approaches the period of the intermittent high-frequency current, as illustrated in FIG. 1, the recorded signal may pass through the scanning position of the laser beam in a high-frequency current off period, in other words, a laser-beam off period, making it difficult to read the recorded signal.

The present invention has been made in light of the circumstances provided above, and has an object of reliably reading a signal recorded in a recording medium to reproduce data corresponding to the recorded signal even if a reproducing linear velocity is increased.

Means for Solving the Problems

A first aspect of the present invention is an optical recording/reproducing system for reading, based on a predetermined reproduction clock, information associated with a recording track of a recording medium by irradiating frequency light. The frequency light is scanned at a predetermined scan velocity. The optical recording/reproducing system includes a modulating unit that modulates light by a drive signal on which a frequency signal is superimposed to thereby output the frequency light, and a synchronizing unit that synchronizes a frequency of the frequency signal with a frequency of the reproduction clock according to the scan velocity.

A second aspect of the present invention is a program readable by a computer installed in an optical recording/reproducing system that reads, based on a predetermined reproduction clock, information associated with a recording track of a recording medium by irradiating frequency light. The frequency light is scanned at a predetermined scan velocity. The optical recording/reproducing system includes a modulating unit that modulates light by a drive signal on which a frequency signal is superimposed to thereby output the frequency light. The program instructs the computer to execute an operation to synchronize a frequency of the frequency signal with a frequency of the reproduction clock according to the scan velocity.

A third aspect of the present invention is an optical recording/reproducing method for reading, based on a predetermined reproduction clock, information associated with a recording track of a recording medium by irradiating frequency light. The frequency light is scanned at a predetermined scan velocity. The optical recording/reproducing method includes modulating light by a drive signal on which a frequency signal is superimposed to thereby output the frequency light, and synchronizing a frequency of the frequency signal with a frequency of the reproduction clock according to the scan velocity.

BRIEF DESCRIPTION OF THE DRAWINGS

FIG. 1 is a view illustrating an example of a relationship between recorded marks written to a part of a recording track and the waveform of a laser beam output obtained by high-frequency superimposing;

FIG. 2 is a block diagram illustrating a schematic structure of a data recording/reproducing system according to a first embodiment of the present invention;

FIG. 3 is a flowchart schematically illustrating an example of operations to be carried out by a computer of the data recording/reproducing system according to the first embodiment of the present invention;

FIG. 4 is a flowchart schematically illustrating an example of operations to be carried out by the computer of the data recording/reproducing system according to the first embodiment of the present invention;

FIG. 5 is a view illustrating a relationship between two intermittent high-frequency currents to be superimposed on a drive current from an APC circuit illustrated in FIG. 2 and laser-beam outputs from an LD unit illustrated in FIG. 2; these laser-beam outputs correspond to the respective intermittent high-frequency currents;

FIG. 6 is a flowchart schematically illustrating an example of operations to be carried out by a computer of a data recording/reproducing system according to a second embodiment of the present invention;

FIG. 7 is a flowchart schematically illustrating an example of operations to be carried out by a computer of a data recording/reproducing system according to a third embodiment of the present invention;

FIG. 8 is a flowchart schematically illustrating an example of operations to be carried out by a computer of a data recording/reproducing system according to a fourth embodiment of the present invention;

FIG. 9 is a flowchart schematically illustrating an example of operations to be carried out by a computer of a data recording/reproducing system according to a modification of the first to fourth embodiments of the present invention.

DESCRIPTION OF CHARACTERS

1 Data recording/reproducing system
3 Recording medium
5 Optical pickup unit
7 Power adjusting unit
9 Servo driver
11 Record and reproduction data processing unit
13 Computer
13a First memory
13b Second memory
15 Laser diode unit
17 Laser diode driver
19 Light control element
21 Beam splitter
23 Stand-up mirror
25 Spindle motor
27 Objective lens
29 Actuator
30 Receiver
31 Monitor photo diode;
33 Amplifier
35 Sample-hold circuit
37 APC circuit
38 LC driver
41 Interface
43 Buffer
45 Modulator and demodulator
49 Digital signal processor
49a linear-velocity setting unit
49b PLL
49c selector

BEST MODES FOR CARRYING OUT THE INVENTION

Embodiments of the present invention will be described hereinafter with reference to the drawings.

First Embodiment

FIG. 2 is a block diagram illustrating a schematic structure of a data recording/reproducing system 1 according to a first embodiment of the present invention.

In FIG. 2, reference numeral 3 represents a recording medium including, for example, a disc-like protective layer and a disc-like recording layer including spiral or concentric recording tracks. For example, as the recording medium 3, a CD, a DVD, a Blu-ray Disc, a HD DVD, or the like can be used.

The data recording/reproducing system 1 according to the first embodiment has a function of recording information on the recording tracks of the recording medium 3 rotating at a desired velocity and a function of reproducing information recorded on the recording tracks of the recording medium 3.

For example, in the First embodiment, the recording tracks, as one structural example, include at least one of lands and grooves alternately arranged in a radial direction. The at least one of the lands and grooves are wobbled at a predetermined frequency, and part of the at least one of the lands and grooves is for example phase-modulated to include information such as address informant of the recording tracks.

Specifically, the data recording/reproducing system 1 is equipped with an optical pickup unit (optical head unit) 5 for recording/reproducing information on/from the recording tracks of the rotating recording medium by irradiating a light spot on the recoding tracks. The data recording/reproducing system 1 is equipped with a power adjusting unit 7 for adjusting power of the irradiated light on the recording medium 3.

The data recording/reproducing system 1 is also equipped with a servo driver 9 as a servo-control system for carrying out: rotating-velocity controls of the recording medium 3, focus-position controls of the spot beam to be irradiated on the recording tracks of the recording medium 3 by the optical pickup unit 5, and tracking controls of the beam spot with respect to the recording tracks.

Moreover, the data recording/reproducing system 1 is equipped with a record and reproduction data processing unit 11 having a function of producing data (referred to as "record data" hereinafter) corresponding to information to be recorded on the recording medium 3 and a function of producing data (referred to as "reproduction data" hereinafter) corresponding to information recorded on the recording medium 3.

The data recording/reproducing system 1 is equipped with a computer 13 that controls the optical pickup unit 5, the power adjusting unit 7, the servo driver 9, and the record and reproduction data processing unit 11.

The computer 13 includes a first memory 13$a$, such as a HDD (Hard Disc Drive), a FLASH MEMORY, or the like, for storing therein data representing processed results and the like, and a second memory 13$b$ serving as a main memory of the computer 13 for storing therein a plurality of programs P loaded from the first memory 13$a$. The plurality of programs P cause the computer 13 to carry out the control operations.

The computer 13 has installed therein a crystal oscillator 13$c$, and is configured to carries out operations according to a clock (crystal clock) issued from the crystal oscillator 13$c$.

Referring to FIG. 2, the optical pickup unit 5 includes a laser diode (LD) unit 15, an LD driver 17, and a light control element 19. The LD unit 15 irradiates a laser beam as light for information recording and/or information reproducing. The LD driver 17 controls the waveform of the laser beam outputted from the LD unit 15. The light control element 19 serves as an element for adjusting the quantity of the laser beam outputted from the LD unit 15. The light control element 19 is made up of a liquid crystal device with a light transmittance that changes with change in an applied voltage from a LC (Light Control) driver described hereinafter.

For example, in the first embodiment, the LD unit 15 and the light control element 19 of the optical pickup unit 5 are arranged such that the optical axis of the laser beam guided by the components 15 and 19 is parallel to the surface of the transparent layer of the recording medium 3.

Note that, in the first embodiment, the light control element 19 has the light transmittance of a substantially 100% (decay rate of 0%) in an initial condition The optical pickup unit 5 also includes a beam splitter 21 disposed on an optical path of the laser beam outputted from the LD unit 15 and transferred through the light control element 19. The beam splitter 21 is operative to transmit therethrough the laser beam travelling through the light control element 19 and to reflect a light beam sent from a stand-up mirror described hereinafter.

The optical pickup unit 5 further includes a stand-up mirror 23 arranged on an optical path of the laser beam passing through the beam splitter 21. The stand-up mirror 23 is configured to reflect the laser beam passing through the beam splitter 21 in a direction perpendicular to the optical axis of the passing laser beam toward the recording medium 3.

The optical pickup unit 5 includes a spindle motor 25. The spindle motor 25 supports the recording medium 3 such that the recording medium 3 faces the stand-up mirror 23 and the optical axis of the laser beam reflected by the stand-up mirror 23 is orthogonal to the surface of the protective layer of the recording medium 3. The spindle motor 25 also rotatably drives the recording medium 3.

The optical pickup unit 5 includes an objective lens 27 interposed between the stand-up mirror 23 and the protective layer of the recording medium 3. The objective lens 27 is operative to focus the laser beam reflected by the stand-up mirror 23 onto a recording track of the recording medium 3 to thereby irradiate the laser beam thereto as a spot beam.

The optical pickup unit 5 includes an actuator 29. The actuator 29 is allowed to move the objective lens 27 in at least a radial direction of the recording medium 3 and a direction close to and away from the recording medium 3. The actuator 29 is electrically connected to the servo driver 9. The actuator 29 is configured to move the objective lens 27 under control of the servo driver 9 to thereby adjust a focusing position and a tracking position of the beam spot.

The objective lens 27 is operative to, during reproduction, receive light reflected from a recording track of the recording medium 3 and to output the received light as a parallel beam with a predetermined beam diameter. The stand-up mirror 23 is operative to reflect the reflected beam transferred through the objective lens 27 so as to transfer the reflected beam to the beam splitter 21.

The beam splitter 21 works to reflect the reflected beam transferred from the stand-up mirror 23.

The optical pickup unit 5 includes a receiver 30. The receiver 30 is arranged on the optical path of the reflected beam reflected by the beam splitter 21. The receiver 30 receives the reflected beam and converts the received beam into an electric signal (referred to as "RF signal" hereinafter).

The power adjusting unit 7 includes a monitor photodiode, referred to as "monitor diode", 31 and an amplifier 33. The monitor diode 31 is arranged on an optical path of a laser beam outputted from a back surface in a package of the LD unit 15; this back surface is opposite to a normal output end of the LD unit 15. The laser beam outputted from the back will be referred to as "backside laser beam". The backside laser beam has the same power as that of the laser beam outputted from the normal output terminal of the LD unit 15.

The monitor diode 31 continuously monitors the power (intensity) of the backside laser beam and outputs the result of the monitoring as a monitor signal (monitor electric signal, such as a monitor current).

The amplifier 33 is electrically connected to the monitor diode 31. The amplifier 33 amplifies the monitor signal outputted from the monitor diode 31.

The amplifier 33 is electrically connected to the computer 13. The computer 13 is allowed to monitor the power of the laser beam irradiated on the recording medium 3 based on the monitor signal amplified by the amplifier 33 and the actually set light transmittance of the light control element 19.

The power adjusting unit 7 includes a sample-hold circuit (S/H) 35 electrically connected to the amplifier 33 and the computer 13. The sample-hold circuit 35 is operative to sample a value of the monitor signal outputted from the amplifier 33 and to hold the sampled value during the execution of APC (Automatic Power Control) by the computer 13.

The power adjusting unit 7 also includes an APC circuit 37 electrically connected to the sample-hold circuit 35 and the LD driver 17. During the execution of the APC by the computer 13, the APC circuit 37 is operative to control a driving current from the LD driver 17 to the LD unit 15 based on the sampled and held value of the monitor signal by the sample-hold circuit 35 such that:

the sampled and held value of the monitor signal is substantially matched with a predetermined value corresponding to a predetermined power level of the laser beam irradiated on the recording medium 3.

This carries out feedback control of the output waveform of the laser beam outputted from the LD unit 15 including the putout power level.

The power adjusting unit 7 includes a light control element driver (LD driver) 38. Under control of the computer 13, the LC driver 38 works to control a voltage to be applied there-from to the light control element 13 to thereby control the light transmittance of the light control element 19.

The record and reproduction data processing unit 11 includes an interface 41 that receives record data (bit-string data) inputted from a connection device during recording. The record and reproduction data processing unit 11 includes a buffer 43 electrically connected to the interface 41 and operative to hold the record data received by the interface 41. The record and reproduction data processing unit 11 includes a modulator and demodulator 45 electrically connected to the buffer 43. Each of the interface 41, buffer 43, and modulator and demodulator 45 is electrically connected to the computer 13. The operations of each of the interface 41, the buffer 43, and the modulator and demodulator 45 are configured to be controlled by the computer 13.

To the computer 13, an input unit 47 is connected. The input unit 47 is allowed to input, to the computer 13, various pieces of information and instructions including: setting information of a linear velocity of the recording medium 3. The linear velocity represents a velocity of a laser beam traveling on a medium during recording and/or reproducing, such as 1×, 2×, . . . , 32×.

To the computer 13, servo driver 9, and modulator and demodulator 45, a DSP (Digital Signal Processor) 49 is connected. The DSP 49 operates under control of the computer 13.

The modulator and demodulator 45 is operative to, during recording, append an error-correcting code, such as a PI (Parity Inner) correcting code and/or a PO (Parity Outer) correcting code to the record data stored in the buffer 43 for each predetermined unit of the record data. In the first embodiment, the modulator and demodulator 45 is operative to, during recording, append the error-correcting code to the record data for each ECC (Error Correction Code) block of the record data.

Note that the ECC block represents a unit of data to be stored in the recording medium 3.

For example, the recording medium 3 according to the first embodiment is a DVD, the ECC block is configured by 280 rows of 182 bytes each. 280 rows consist of 192 rows and 16 rows of the PO correcting code, and 182 bytes consist of 172 bytes of data and 10 bytes of the PI connecting code. Specifically, 12 rows of 172 bytes constitutes one data frame, and 16 date frames constitute one ECC block.

For example, in the first embodiment, the recode data of each data frame of each ECC block to which the error-correcting code has been appended is converted into a signal according to a clock (wobble clock) with a wobble frequency of the recording tracks such that the signal is changed from a high level to a low level or the low level to the high level at each bit of "1" of the record signal. The wobble clock is extracted from a wobble signal obtained by scanning the wobbled recording tracks by the computer 13.

The converted data, such as NRZI data (Non Return to Zero Inverted) data, corresponds to recorded signals (recorded marks, recorded pits) to be written to the record tracks of the recording medium 3.

Note that, in the first embodiment, a bit length (run length or recorded-signal length) of the NRZI data until its edge changes depending on an encoding or the like. For example, the bit lengths of the NRZI data are set to be NT. The reference character N varies depending on the type of the recording medium 3. For example, when the recording medium 3 is a DVD, the N is set to be equal to or greater than 3, and when the recording medium 3 is a Blu-ray Disc, the N is set to be equal to or greater 2. The reference character T represents the period of the wobble clock.

Specifically, in the first embodiment, on a recording track of the recording medium 3, the laser beam, which has a power level on the recording medium 3 being automatically feedback-controlled to a recording power level and has a modulated output waveform, such as a multipulse-modulated output waveform, is irradiated. This allows recorded signals corresponding to respective run length of the NRZI data to be written onto a recording track of the recording medium 3.

The output-waveform control (multipulse control of the laser beam is called "Write Strategy". Proper setting of the width of each of independent multi-pulses of the output waveform of the laser beam according to the power level of the laser beam on the recording medium 3 prevents deterioration of the recorded signals that results from continuous irradiation of a laser beam with a constant power level.

During reproduction, the LD driver 17 has a function F1. The function F1 is to set a superimposed frequency of the order of hundreds of megahertz according to a superimposition-frequency control command indicative of a superimposed frequency of current on the drive current sent from the computer 13. The function F1 is also to superimpose, on the drive current, an intermittent high-frequency current with the superimposed frequency on the controlled drive current. For example, the intermittent high-frequency current is in the form of a sine wave with its on-duty being less than 50%.

Light reflected from a corresponding recorded signal based on the irradiated laser beam is detected through the receiver 30 as the RF signal by operations of the optical pickup unit 5.

The modulator and demodulator 45, during reproduction, has a function of:

amplifying the RF signal obtained by the receiver 30; and producing a wobble-modulated signal, a tracking error signal indicative of an error caused by the tracking control, and a focusing error signal caused by the focusing control.

The modulator and demodulator 45 also has a function of demodulating (decoding) reproduction data (bit-string data) from the RF signal according to an RF clock obtained by the DSP 49 described hereinafter. The demodulated playback data is sent to the computer 13. The computer 13 carries out an error detecting task, a determining task to determine whether a detected error is allowed to be corrected, a correcting task to carry out error-correction when it is determined that the detected error is allowed to be corrected. The reproduction data after the correction task is stored in the buffer 43 by the computer 13.

The interface 41 works to, during reproduction, output the reproduction data stored in the buffer 43 to an information output device connected to the interface 41 under control of the information output device.

The DSP 49 includes a liner-velocity setting unit 49a. The linear-velocity setting unit 49a works to send, to the servo driver 9, a liner-velocity command corresponding to the setting information of the linear velocity determined by the input unit 47 and passed via the computer 13.

The DSP 49 also includes a PLL (Phase Locked Loop) module 49b for outputting a clock properly synchronized with an input signal.

The PLL module 49b includes a PLL circuit 49b1 that extracts the RF clock from inputted NRZI data, a PLL circuit 49b2 that produces a multiple wobble clock from the wobble clock inputted thereto, and a PLL circuit 49b3 that produces a multiple crystal clock from the crystal clock inputted thereto.

For example, the PLL circuit 49b1 includes a digital phase comparator, a digital loop filter, a digital VCO (Voltage Controlled Oscillator), and a frequency divider.

According to the PLL circuit 49*b*1, a phase difference between the NRZI data inputted to the digital phase comparator and feedback digital data outputted from the digital VCO with its frequency being divided by the frequency divider to 1/m (m is a positive integer) is calculated by the digital phase comparator. The phase difference data is inputted to the digital VCO via the loop filter.

By the digital VCO, a clock with its frequency being adjusted to cancel the inputted phase difference data to zero is fed back to the digital phase comparator via the frequency divider. Repeat of the feedback loop allows the clock (RF clock) synchronized with the phase of the NRZI data to be outputted. The RF clock can be multiplied after being outputted from the PLL circuit 49*b*1.

The PLL circuits 49*b*2 and the 49*b*3 each substantially have the same structure as that of the PLL circuit 49*b*1. Thus, the multiple crystal clock and the multiple wobble clock are respectively outputted from the PLL circuits 49*b*2 and 49*b*3.

The DSP 49 includes a selector 49*c* for selecting any one of the RF clock, the multiple wobble clock, and the multiple crystal clock produced by the PLL module 49*b*.

Specifically, the servo driver 9 is operative to drive the spindle motor 25 according to the linear-velocity command from the linear-velocity setting unit 49*a*:

turn the recording medium 3 with the set linear velocity being kept constant (CLV: Constant Linear Velocity); or turn the recording medium 3 with an angular velocity being kept constant based on the set liner velocity (CAV: Constant Angular Velocity).

In addition, the servo driver 9 is operative to control the actuator 29 based on the tracking error signal and the focusing error signal obtained by the modulator and demodulator 45 to thereby carry out the focusing position control and the tracking control of the spot light to be irradiated on a recording track of the recording medium 3.

In the first embodiment, as the light control element 19 configured to change the quantity of the output laser beam according to control information applied from the computer 13 via the LC driver 38, the liquid crystal device with the light transmittance that changes with change in control information applied from the computer 13 via the LC driver 38 is used, but the present invention is not limited to the structure.

For example, as a light control element according to the present invention, a variable light attenuator with a light attenuation quantity, in other words, a volume of light to be transmitted therethrough can be used; this light attenuation changes with change in a voltage applied from the computer 13 via a driver. As an example of the variable light attenuator, a variable ND (Neutral Density) filter or the like is used. A polarizer, such as a wavelength plate or a crystal liquid element, and an element designed by a beam splitter can be used as a light control element according to the present invention.

For example, the polarizer is disposed in place of the light control element 19 illustrated in FIG. 2, and the polarizer is used in combination with the beam splitter 21. The structure can constitute a light control element according to the present invention.

According to the structure, an optical axial direction (polarization direction) of the polarizer is changed according to control information applied from the computer 13 via a driver by a predetermined angle from a polarization direction of the incident laser beam. This allows the beam splitter 21 to split the laser beam transferred through the polarizer into a predetermined percent of the laser beam and the remaining percent thereof in light-volume. This can change the light transmittance of the incident laser beam transmitted through the polarizer and the beam splitter 21.

The computer 13 according to the first embodiment is configured to carry out a control task of the LD driver 17 and the light control element 19, a control task of the power adjusting unit 7, a control task of the servo driver 9, an error detecting and/or correcting task in accordance with programs P loaded to the second memory 13*b*.

Next, specific operations of the data recording/reproducing system 1 according to the first embodiment will be described with a particular emphasis on the control tasks of the power adjusting unit 7, the LD driver 17, and the light control element 19 by the computer 13.

In the data recoding/reproducing system 1 according to the first embodiment, when reproducing data recorded on the recording tracks of the recording medium 3, the computer 13 carries out the operations illustrated in FIG. 3 in accordance with at least one of the programs P loaded in the second memory 13*b*.

First, in step S1, the computer 13 carries out a recording-medium playback operation while the light transmittance of the light control element 19 is set to an initial percentage of 100%.

Note that 100% of the light transmittance of the light control element 19 means the light transmittance of the light control element 19 during no voltage being applied to the light control element 19.

Specifically, as the recording-medium playback operation, the computer 13 controls the spindle motor 25 through the DSP 49 and the servo driver 9 to thereby:

turn the recording medium 3 at the linear velocity inputted from the input unit 47;

set the power level of the laser beam irradiated on the recording medium 3 to a predetermined reproducing power level;

control the sample-hold circuit 35 based on the set reproducing power level during the execution of the APC; and send, to the LD driver 17, the superimposition-frequency control command indicative of a predetermined frequency as the superimposed frequency of current (referred to as a superimposed frequency f1 of the order of hundreds of megahertz).

Based on the control during the execution of the APC in step S1, the sample-hold circuit 35 samples and holds a value of the monitor signal outputted from the amplifier 33 and measured by the monitor diode 31, and outputs the held value of the monitor signal to the APC circuit 37.

At that time, the APC circuit 37 sends, to the LD driver 17, the power control command to substantially match the monitored power level corresponding to the sampled and held value of the monitor signal with the reproduction power level.

Based on the power control command sent from the APC circuit 37, the LD driver 17 controls the drive current, and superimpose, on the drive current, an intermittent high-frequency current Iout10 with the superimposed frequency f1 corresponding to the superimposition-frequency control command indicative of the superimposed frequency of current. The LD driver 17 provides the intermittent high-frequency current Iout10 to the LD unit 15 to thereby drive the LD unit 15. For example, the intermittent high-frequency current Iout10 is in the form of a sine wave with its on-duty being less than 50%. This causes the LD unit 15 to output the high-frequency superimposed laser beam having the on-duty less than 50%.

As a result, the high-frequency superimposed laser beam is irradiated on the recorded signals written to a recording track of the recording medium 3 by operations of the optical pickup unit 5. The power of the laser beam irradiated on the recording medium 3 is substantially kept constant at the reproducing power level by the APC control.

The laser beam irradiated on a recording track of the recording medium 3 searches a playback start point based on address information by operations of the optical pickup unit 5 under control of the computer 13; this address information is recognized by the wobble signal obtained by scanning of wobbled-recording tracks by the computer 13.

In parallel with the operation in step S1, the computer 13 monitors the linear velocity of the recording medium 3 from the servo driver 9, and determines whether the monitored liner velocity is equal to or greater than the predetermined velocity in step S2.

When a result of the determination in step S2 is NO, that is, the monitored linear velocity is less than the threshold velocity, the computer 13 determines that a recorded signal does not pass through the scanning position of the laser beam during a laser-beam off period, terminating the operations.

Otherwise, when the result of the determination in step S2 is YES, that is, the monitored linear velocity is equal to or greater than the threshold velocity, the computer 13 determines that a recorded signal may pass through the scanning position of the laser beam during a laser-beam off period. In other words, the computer 13 determines that the readout of a recorded signal by the laser beam may be impossible, proceeding to step S3.

In step S3, the computer 13 carries out any one of:

an operation to send, to the LD driver 17 a superimposition-frequency increasing command to change the superimposed frequency f1 to a superimposed frequency f2 higher than the superimposed frequency f1 as the superimposition-frequency control command; and an operation to send, to the LD driver 17 and the DSP 49, a reproduction-clock synchronizing command to synchronize the superimposed frequency with the multiple wobble clock or the multiple crystal clock as a reproduction clock.

When the superimposed-frequency increasing command is sent from the computer 13, the LD driver 17 increases the frequency f1 of the intermittent high-frequency current Iout10 to the frequency f2 corresponding to the superimposition-frequency increasing command while controlling the drive current based on the power control command sent from the APC circuit 37 (see the superimposed-frequency setting function F1).

Otherwise, when the reproduction-clock synchronizing command is sent from the computer 13, the DSP 49 selects via the selector 49c the multiple wobble clock or the multiple crystal clock, and sends, to the LD driver 17, the selected clock as the reproduction clock.

When the reproduction-clock synchronizing command is sent from the computer 13, the LD driver 17 synchronizes the frequency f1 of the intermittent high-frequency current Iout10 superimposed on the drive current with the frequency of the reproduction clock (multiple wobble clock or the multiple crystal clock) sent from the DSP 49 while controlling the drive current based on the power control command sent from the APC circuit 37.

Next, the computer 13 determines whether the laser beam is actually searching the playback start address, in other words, whether an RF signal corresponding to reflected light from the recording medium 3 is sent in step S5.

When a result of the determination in step S4 is NO, that is, no RF signals are sent, the computer 13 determines that the laser beam is actually searching the playback start address, proceeding to step S5. In step S5, the computer 13 maintains unchanged the frequency of the intermittent high-frequency current Iout10 determined in step S3.

When the irradiated position of the laser beam is matched with the playback start address by the playback-start address searching operation by the optical pickup unit 5, light reflected from the playback start address of a corresponding one of the recorded signals based on the irradiated laser beam is detected through the receiver 30 as the RF signal by operations of the optical pickup unit 5.

The detected RF signal is decoded by the modulator and demodulator 45 as reproduction data (bit-string data) of the ECC blocks, and thereafter, the reproduction data is sent to the computer 13. After the error-correcting task has been applied to the reproduction data, the reproduction data is outputted to an information output device or the like via the buffer 43 and the interface 41.

At that time, when a result of the determination in step S4 is YES, that is, the RF signal is sent, the computer 13 proceeds to step S6 and carries out an RF-clock synchronizing task in step S6.

The RF-clock synchronizing task in step S6 is illustrated in FIG. 4 Specifically, the computer 13 controls the DSP 49 to carry out PLL pull-in for the NRZI data, and determines whether the NRZI data is PLL locked, in other words, input and output of the PLL 49b is synchronized in phase with each other) in step S6a1.

when a result of the determination in step S6a1 is NO, that is, the NRZI data is unlocked, the computer 13 controls the DSP 49 to adjust the frequency of the clock in the digital VCO in step S6a2, and thereafter proceeds to step S6a1, carrying out again the PLL-lock determining operation in step S6a1.

As a result of the repetitions of the operations in steps S6a1 and S6a2, when it is determined that the NRZI data is PLL locked, the computer 13 sends, to the DSP 49 and the LD driver 17, a reproduction-clock synchronizing command to synchronize the superimposed frequency f1 with the frequency of the RF clock in step S6a3.

The DSP 49 selects via the selector 49c the RF clock outputted from the PLL 49b1, and sends, to the LD driver 17, the selected RF clock as the reproduction clock.

When the reproduction-clock synchronizing command is sent from the computer 13, the LD driver 17 synchronizes the frequency f1 of the intermittent high-frequency current Iout10 superimposed on the drive current with the frequency f3 of the reproduction clock (RF clock) sent from the DSP 49 while controlling the drive current based on the power control command sent from the APC circuit 37.

FIG. 5 is a view illustrating a relationship among:

intermittent high-frequency currents Iout10 and Iout11 to be superimposed on the drive current Id from the APC circuit 37 in steps S2 and S6 (S6a1 to S6a3);

laser-beam outputs Pout10 and Pout11 outputted from the LD unit 15 and corresponding to the respective intermittent high-frequency currents Iout10 and Iout11;

a plurality of recorded marks (recorded pits) of the recorded signals written from the playback start address in the travelling direction of the recording tacks; and the NRZI data obtained by the plurality of recorded marks.

Specifically, as a result of the determination in step S2, when the monitored liner velocity is equal to or greater than the threshold velocity (YES in step S2), as clearly understood by comparison between the recorded signals (recorded marks) and the laser-beam output waveform illustrated in FIG. 1, a recorded signal may pass through the scanning position of the laser beam in a laser-beam off period.

At that time, in the first embodiment, referring to FIG. 5, the frequency f1 of the high-frequency current Iout10 being synchronized with the frequency f3 of the reproduction clock (RF clock) is superimposed on the drive signal as the high-frequency current Iout11 while the power of the laser beam irradiated on the recording medium 3 is substantially maintained constant by the APC-on control.

The RF clock is extracted from the NRZI data obtained based on the edges of the recorded marks of the recorded signals. For this reason, as illustrated in FIG. 5, it is possible to synchronize each of the laser-bema output timings from the LD unit 15 with the timing at which a corresponding edge of a corresponding one of the recorded marks of the recorded signals.

As a result, referring to FIG. 5, each of the recorded marks of the recorded signals each pass through the scanning position of the laser beam during the laser-beam output being on at all times, making it possible to reliably read the recorded signals.

As described above, it is assumed that the reproducing linear velocity of the recording medium 3 is so set to a desired velocity that a recorded signal may pass through the scanning position of the laser beam in a laser-beam off period. In this assumption, in the first embodiment, the synchronization of the superimposed frequency of the intermittent high-frequency current with the frequency of the RF clock extracted from the RF signal obtained by the recorded signals can reliably read the recorded signals.

As a result, it is possible to provide the data recording/reproducing system 1 that, while improving the reproduction performance with increase in the reproducing linear velocity, prevents the skip of a recorded signal.

According to the first embodiment, in addition to during which the recorded signals are actually read from the playback start address in a recording track, during the playback start address is searched, the frequency of the intermittent high-frequency signal to be superimposed on the drive current is increased, or synchronized with the frequency of the reproduction clock (multiple wobble clock and/or multiple crystal clock) sent from the DSP 49.

In a case where the former superimposed-frequency increasing method is used, when it is shifted from the searching mode to the reading mode, it is possible rapidly transfer the superimposed frequency to the mode in which the superimposed frequency is synchronized with the RF clock. This results in rapidly changing the intermittent high-frequency current to be superimposed on the drive current when it is shifted from the address searching mode to the reading mode for each of the recorded signals.

In a case where the latter frequency-synchronizing method is used, when it is shifted from the searching mode to the reading mode, it is possible rapidly and smoothly transfer the superimposed frequency from the mode in which the superimposed frequency is synchronized with the multiple wobble clock or the multiple crystal clock to the mode in which the superimposed frequency is synchronized with the RF clock.

This results in rapidly and stably oscillating the intermittent high-frequency current to be superimposed on the drive current when it is shifted from the address searching mode to the reading mode for the recorded signals.

Second Embodiment

A data recording/reproducing system according to a second embodiment of the present invention will be described hereinafter with reference to the corresponding drawings. Note that the hardware structural elements of the data recording/reproducing system according to the second embodiment is substantially identical to those of the data recording/reproducing system 1 according to the first embodiment. For this reason, like reference characters are assigned to the identical elements in the data recording/reproducing systems according to the first and second embodiments so that descriptions of the elements of the data recording/reproducing system of the second embodiment will be omitted or simplified.

In the data recoding/reproducing system 1 according to the second embodiment, when reproducing data recorded on the recording tracks of the recording medium 3, the computer 13 carries out the operations illustrated in FIG. 6 in place of in FIG. 3 in accordance with at least one of the programs P loaded in the second memory 13b. In the second embodiment, the operations illustrated in FIG. 6 are executed for each ECC block of the recorded data as a target for reproduction.

The operations in steps S1 to S4 by the computer 13 are identical to those in steps S1 to S4 of FIG. 3, and therefore, the descriptions of those are omitted.

When a result of the determination in step S4 is NO, the computer 13 carries out the operation in step S5 illustrated in FIG. 3.

Otherwise, when a result of the determination in step S4 is YES, that is, the RF signal is sent, the computer 13 proceeds to step S10 illustrated in FIG. 6.

In step S10, the computer 13 computes the error rate as the reproducing characteristic based on the reproduction data of an ECC block sent thereto. Moreover, in step S10, the computer 13 determines whether the computed error rate is equal to or greater than a predetermined threshold value.

Note that the reproducing characteristic according to the second embodiment is an index for evaluating the reproduction data obtained by the record and reproduction data processing unit 11 and the computer 13. For example, in the second embodiment, the percentage of PI error representing the number of error bytes in all of the rows of each ECC block, which corresponds to the division of the number of error bytes by the number of normal bytes in each ECC block, is used as the reproducing characteristic.

When a result of the determination in step S10 is NO, that is, the error rate is less than the predetermined threshold value, the computer 13 determines that the corresponding ECC block can be reproduced, exiting the operations.

Otherwise, when a result of the determination in step S10 is YES, that is, the error rate is equal to or greater than the predetermined threshold value, the computer 13 determines that the readout of the corresponding ECC block is difficult, proceeding to step S6. Thereafter, the computer 13 executes the RF-clock synchronizing task set forth above (see step S6 of FIG. 3) to thereby synchronize each of the laser-bema output timings from the LD unit 15 with the timing at which a corresponding edge of a corresponding one of the recorded marks of the recorded signals (see FIG. 5).

As described above, it is assumed that the reproducing linear velocity of the recording medium 3 is so set to a desired velocity that a recorded signal may pass through the scanning position of the laser beam in a laser-beam off period. In this assumption, in the second embodiment, the synchronization of the superimposed frequency of the intermittent high-frequency current with the frequency of the RF clock extracted from the RF signal obtained by the recorded signals can reliably read the recorded signals.

As a result, like the first embodiment, it is possible to provide the data recording/reproducing system 1 that, while improving the reproduction performance with increase in the reproducing linear velocity, prevents the skip of a recorded signal.

Third Embodiment

A data recording/reproducing system according to a third embodiment of the present invention will be described hereinafter with reference to the corresponding drawings. Note that the hardware structural elements of the data recording/reproducing system according to the third embodiment is substantially identical to those of the data recording/reproducing system 1 according to the first embodiment. For this reason, like reference characters are assigned to the identical elements in the data recording/reproducing systems according to the first and third embodiments so that descriptions of the elements of the data recording/reproducing system of the third embodiment will be omitted or simplified.

In the data recoding/reproducing system according to the third embodiment, when reproducing data recorded on the recording tracks of the recording medium 3, the computer 13 carries out the operations illustrated in FIG. 7 in place of in FIG. 3 in accordance with at least one of the programs P loaded in the second memory 13b.

The operations in steps S1 and S2 by the computer 13 are identical to those in steps S1 and S2 of FIG. 3, and therefore, the descriptions of those are omitted.

When a result of the determination in step S2 is YES, that is, the monitored linear velocity is equal to or greater than the threshold velocity, the computer 13 determines that a recorded signal may pass through the scanning position of the laser beam during a laser-beam off period. In other words, the computer 13 determines that the readout of a recorded signal by the laser beam may be impossible, proceeding to step S20 of FIG. 7.

In step S20, the computer 13 controls the voltage applied to the light control element 19 via the LC driver 38 while executing the APC control, that is, while maintaining constant the power of the laser beam irradiated on the recording medium 3 to thereby reduce the light transmittance of the light control element 19 to a preset value, such as 50%.

Note that 50% of the light transmittance of the light control element 19 means that the percentage of the monitored power level during control of the voltage being applied to the light control element 19 to the monitored power level during no voltage being applied thereto (100% of the light transmittance) becomes substantially 50%.

The reduction in the light transmittance of the light control element 19 and the APC control (the irradiated-power constant control) allow the output power of the laser beam outputted from the LD unit 15 to increase.

Thereafter, execution of the operations in steps S3 to S6 by the computer 13 allows each of the laser-bema output timings from the LD unit 15 to be synchronized with the timing at which a corresponding edge of a corresponding one of the recorded marks of the recorded signals (see FIG. 5).

As described above, in the third embodiment, in addition to the effect of improving the reproduction performance by maintaining the reliability of reading the recorded signals, it is possible to, while the power of the irradiated laser beam on the recording medium 3, increase the output power of the LD unit 15, thus reducing the laser noise, and to intermittently turn on and off the laser beam through the LD unit 15.

This makes it possible to improve the reproduction performance while preventing the protective layer of the recording medium 3 from being deteriorated.

Fourth Embodiment

A data recording/reproducing system according to a fourth embodiment of the present invention will be described hereinafter with reference to the corresponding drawings. Note that the hardware structural elements of the data recording/reproducing system according to the fourth embodiment is substantially identical to those of the data recording/reproducing system 1 according to the first embodiment. For this reason, like reference characters are assigned to the identical elements in the data recording/reproducing systems according to the first and fourth embodiments so that descriptions of the elements of the data recording/reproducing system of the fourth embodiment will be omitted or simplified.

In the data recoding/reproducing system according to the fourth embodiment, when reproducing data recorded on the recording tracks of the recording medium 3, the computer 13 carries out the operations illustrated in FIG. 8 in place of in FIG. 3 in accordance with at least one of the programs P loaded in the second memory 13b.

The operations in steps S1 and S2 by the computer 13 are identical to those in steps S1 and S2 of FIG. 3, and therefore, the descriptions of those are omitted.

When a result of the determination in step S2 is YES, that is, the monitored linear velocity is equal to or greater than the threshold velocity, the computer 13 determines that a recorded signal may pass through the scanning position of the laser beam during a laser-beam off period. In other words, the computer 13 determines that the readout of a recorded signal by the laser beam may be impossible, proceeding to step S20 of FIG. 8.

In step S20, the computer 13 controls the voltage applied to the light control element 19 via the LC driver 38 while executing the APC control, that is, while maintaining constant the power of the laser beam irradiated on the recording medium 3 to thereby reduce the light transmittance of the light control element 19 to a preset value, such as 50%.

The reduction in the light transmittance of the light control element 19 and the APC control (the irradiated-power constant control) allow the output power of the laser beam outputted from the LD unit 15 to increase.

Thereafter, the computer 13 executes the operations in steps S3 and 54 illustrated in FIG. 3.

When a result of the determination in step S4 is NO, the computer 13 carries out the operation in step S5 illustrated in FIG. 3.

Otherwise, when a result of the determination in step S4 is YES, that is, the RF signal is sent, the computer 13 proceeds to step S10 illustrated in FIG. 8.

In step S10, the computer 13 computes the error rate as the reproducing characteristic based on the reproduction data of an ECC block sent thereto. Moreover, in step S10, the computer 13 determines whether the computed error rate is equal to or greater than the predetermined threshold value.

When a result of the determination in step S10 is NO, that is, the error rate is less than the predetermined threshold value, the computer 13 determines that the corresponding ECC block can be reproduced, exiting the operations.

Otherwise, when a result of the determination in step S10 is YES, that is, the error rate is equal to or greater than the predetermined threshold value, the computer 13 determines that the readout of the corresponding ECC block is difficult, proceeding to step S6. Thereafter, the computer 13 executes the RF-clock synchronizing task set forth above (see step S6 of FIG. 3) to thereby synchronize each of the laser-bema output timings from the LD unit 15 with the timing at which a corresponding edge of a corresponding one of the recorded marks of the recorded signals (see FIG. 5).

As described above, it is assumed that the reproducing linear velocity of the recording medium 3 is so set to a desired velocity that a recorded signal may pass through the scanning position of the laser beam in a laser-beam off period. In this assumption, in the fourth embodiment, the synchronization of the superimposed frequency of the intermittent high-frequency current with the frequency of the RF clock extracted from the RF signal obtained by the recorded signals can reliably read the recorded signals. As a result, like the first embodiment, it is possible to provide the data recording/reproducing system 1 that, while improving the reproduction performance with increase in the reproducing linear velocity, prevents the skip of a recorded signal.

In addition to the effect, it is possible to increase the output power of the LD unit 15, thus reducing the laser noise and to intermittently turn on and off the laser beam through the LD unit 15 while the power of the laser beam irradiated on the recording medium 3.

This makes it possible to improve the reproduction performance while preventing the protective layer of the recording medium 3 from being deteriorated.

In the first to fourth embodiments, according to the superimposition-frequency increasing command and/or the reproduction clock synchronizing command, the LD driver 17 changes the superimposed frequency of the intermittent high-frequency current to be superimposed on the drive current of the LD unit 15, but the present invention is not limited to the structure.

For example, in the first embodiment, the computer 13 has stored in the first memory 13a data representing a frequency characteristic of current-attenuation associated with current transfer between the LD driver 17A and the LD unit 15. For example, the current-attenuation frequency characteristic is a current-attenuation frequency characteristic of wiring between the LD driver 17 and the LD unit 15.

At that moment, as step S3A corresponding to step S3, referring to FIG. 9, based on the superimposed frequency increase from the frequency f1 to the frequency f3, the computer 13 obtains a current attenuation during current transfer from the LD driver 17 to the LD unit 15 from the current-attenuation frequency characteristic data stored in the memory 13a. Then, the computer 13, as step S3B, sends, to the LD driver 17, a correction command indicative of a correction current to cancel the obtained current attenuation in addition to the superimposition-frequency increasing command and/or the reproduction clock synchronizing command.

While controlling the drive current based on the power control command sent from the APC circuit 37, the LD driver 17 changes the frequency f1 of the intermittent high-frequency current Iout10 based on the superimposition-frequency increasing command and/or the reproduction clock synchronizing command. In addition, the LD driver 17 increases the amplitude of the intermittent high-frequency current Iout10 by the correction current contained in the correction command.

As a result, it is possible to continuously maintain on the level of the high-frequency superimposed laser beam outputted from the LD unit 15, and to correct the attenuation of the intermittent high-frequency current being transferred from the LD driver 17 to the LD unit 15.

In the operations identical to the operation in step S6a3 and that in the step S3 according to the other embodiments, the operations in steps S3A and S3B can be carried out.

Note that, in the first to fourth embodiments, as the reproducing characteristic that is an index for evaluating the reproduction data obtained by the record and reproduction data processing unit 11 and the computer 13, the PI error rate for each ECC block is used, but the present invention is not limited to the structure.

Specifically, various pieces of data that are responsible for reproducing-data evaluating index, such as jitter representing the rate of variation between the reproduction data and a clock extracted from the reproduction data, can be used as the reproducing characteristic.

In the first to fourth embodiments, the control task for the light control element 19 in the optical pickup unit 5, the control task for the power adjusting unit 7, the control task for the servo driver 9, and the process associated with the error-detecting and/or error-correcting tasks are configured to be carried out by the computer 13 in accordance with the corresponding programs P. The present invention is however not limited to the structure.

Specifically, these tasks can be shared by two or more computers.

In the first to fourth embodiments, the superimposition-frequency setting function F1 can be carried out, as the superimposition magnitude setting process and the superimposition-frequency setting process, by a computer circuit, such as a microcomputer, installed in the LD driver in accordance with programs externally loaded from, for example, a computer or the like.

In the first to fourth embodiments, when the monitored linear velocity is less than the threshold velocity corresponding to the minimum mark length, the computer 13 determines that the recorded signals can be read by the laser beam, but the present invention is not limited to the structure.

For example, during the CAV reproduction, the computer 13 can continuously monitor the actual reproducing liner velocity via the serve driver 9. This configuration allows, even if the reproducing linear velocity increases toward the outer periphery of the recording medium 3 during the CAV reproduction up to a threshold velocity, such as 4× corresponding to 3T and over, the computer 13 to detect the increase in the reproducing linear velocity equal to or greater the threshold velocity to thereby carry out the frequency-increasing task and/or the reproduction-clock synchronizing task (see step S3), and the RF-clock synchronizing task (see step S6).

This prevents the skip of a recorded signal.

In the first to fourth embodiments, as the operation in step S6, the intermittent high-frequency current to be superimposed on the drive current is synchronized with the frequency of the RF clock, but the present invention is not limited to the structure. For example, as set forth above, the wobble clock is used as the recording clock, so the wobble clock is identical to the RF clock. Thus, as the operation in step S6, the intermittent high-frequency current to be superimposed on the drive current can be synchronized with the frequency of the wobble clock in place of the RF clock.

In the first to fourth embodiments, during reproduction, the LD driver is configured to superimpose the sinusoidal intermittent high-frequency current with its on-duty being less than 50% on the drive current to the LD unit to thereby drive the LD unit, but the present invention is not limited to the structure.

Specifically, the LD driver can use, as the high-frequency current to be superimposed on the drive current, a cyclically waved current except for a sinusoidally waved current. Moreover, the LD driver can set the on-duty of the high-frequency current to a desired percentage.

In the first to fourth embodiments, the monitor diode is arranged on the optical path of the backside laser beam outputted from the back surface opposing the normal output end in the package of the LD unit 15. The monitor diode is configured to monitor the backside laser beam. The present invention is not however limited to the arrangement. For example, the monitor diode can be configured to continuously monitor the power of part of the laser beam passing through the beam splitter 21 and the stand-up mirror 23 illustrated in FIG. 2. The monitor diode can be arranged on an optical path between the light control element 19 and the objective lens 27, or on an optical path branched from an optical system between the light control element 19 and the objective lens 27, and configured to monitor reflected light on the corresponding optical path.

The present invention is not limited to the aforementioned embodiments and their modifications, and can be implemented as variations of the aforementioned embodiments and their modifications within the scope of the present invention.

The invention claimed is:

1. An optical recording/reproducing system for reading, based on a predetermined reproduction clock, information associated with a recording track of a recording medium by irradiating frequency light, the frequency light being scanned at a predetermined scan velocity, the optical recording/reproducing system comprising:
   a modulating unit that modulates light by a drive signal on which a frequency signal is superimposed to thereby output the frequency light;
   a synchronizing unit that synchronizes a frequency of the frequency signal with a frequency of the reproduction clock according to the scan velocity; and
   a first determining unit that determines whether the scan velocity is equal to or greater than a threshold velocity, the threshold velocity being set based on a minimum run length of a recorded signal included in the information and a modulation period of the frequency light,
   wherein the synchronizing unit includes a synchronizing module that synchronizes the frequency of the frequency signal with the frequency of the reproduction clock when it is determined that the scan velocity is equal to or greater than the threshold velocity by the first determining unit.

2. The optical recording/reproducing system according to claim 1, further comprising:
   a second determining unit that determines whether a value of data indicative of a reproducing characteristic of data reproduced based on the recorded signal is equal to or greater than a threshold value associated with difficulty in reproducing when it is determined that the scan velocity is equal to or greater than the threshold velocity by the first determining unit,
   wherein the synchronizing unit includes a synchronizing module that synchronizes the frequency of the frequency signal with the frequency of the reproduction clock when it is determined that the value of the data indicative of the reproducing characteristic is equal to or greater than the threshold value associated with difficulty by the second determining unit.

3. The optical recording/reproducing system according to claim 2, wherein the data indicative of the reproducing characteristic of the data reproduced based on the recorded signal includes at least one of an error rate and jitter, the error rate representing a percentage of error in the reproduced data, the jitter representing a rate of variation between the reproduced data and a clock extracted from the reproduced data.

4. A non-transitory computer-readable storage medium storing program instructions readable by a computer installed in an optical recording/reproducing system that reads, based on a predetermined reproduction clock, information associated with a recording track of a recording medium by irradiating frequency light, the frequency light being scanned at a predetermined scan velocity, the optical recording/reproducing system including a modulating unit that modulates light by a drive signal on which a frequency signal is superimposed to thereby output the frequency light, wherein the program instructions, upon execution by the computer, performs the method, the method comprising: executing
   execute an operation to synchronize a frequency of the frequency signal with a frequency of the reproduction clock according to the scan velocity; and
   synchronizing the frequency of the frequency signal with the frequency of the reproduction clock when it is determined that the scan velocity is equal to or greater than a threshold velocity, the threshold velocity being set based on a minimum run length of a recorded signal included in the information and a modulation period of the frequency light.

5. An optical recording/reproducing method for reading, based on a predetermined reproduction clock, information associated with a recording track of a recording medium by irradiating frequency light, the frequency light being scanned at a predetermined scan velocity, the optical recording/reproducing method comprising:
   modulating light by a drive signal on which a frequency signal is superimposed to thereby output the frequency light; and
   synchronizing a frequency of the frequency signal with a frequency of the reproduction clock according to the scan velocity,
   wherein the synchronizing synchronizes the frequency of the frequency signal with the frequency of the reproduction clock when it is determined that the scan velocity is equal to or greater than a threshold velocity, the threshold velocity being set based on a minimum run length of a recorded signal included in the information and a modulation period of the frequency light.

6. The optical recording/reproducing system according to claim 1, further comprising a superimposed magnitude control unit that:
   obtains, from an attenuation frequency characteristic during the frequency signal being transferred, an attenuation of the frequency signal corresponding to a controlled variable of the superimposed frequency of the frequency signal; and
   superimposes, on the drive signal, the frequency signal having a correction superimposed magnitude, the correction superimposed magnitude correcting the obtained attenuation.

7. The optical recording/reproducing system according to claim 2, further comprising a superimposed magnitude control unit that:
   obtains, from an attenuation frequency characteristic during the frequency signal being transferred, an attenuation of the frequency signal corresponding to a controlled variable of the superimposed frequency of the frequency signal; and
   superimposes, on the drive signal, the frequency signal having a correction superimposed magnitude, the correction superimposed magnitude correcting the obtained attenuation.

* * * * *